United States Patent
Esnault et al.

(10) Patent No.: US 7,222,481 B2
(45) Date of Patent: May 29, 2007

(54) HYBRID CABLES, A PROCESS FOR OBTAINING SUCH AND COMPOSITE FABRICS INCORPORATING SUCH

(75) Inventors: Philippe Esnault, Greenville, SC (US); Hubert Pacherie, Clermont-Ferrand (FR); Pierre Chavaroche, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/877,364

(22) Filed: Jun. 25, 2004

(65) Prior Publication Data

US 2004/0265581 A1    Dec. 30, 2004

Related U.S. Application Data

(63) Continuation of application No. PCT/EP03/00311, filed on Jan. 15, 2003.

(30) Foreign Application Priority Data

Jan. 17, 2002    (FR) .................................. 02 00571

(51) Int. Cl.
    *D02G 3/22*    (2006.01)
(52) U.S. Cl. ....................................................... 57/210
(58) Field of Classification Search .................. 57/210, 57/230, 231
    See application file for complete search history.

(56) References Cited

U.S. PATENT DOCUMENTS

| | | | |
|---|---|---|---|
| 3,977,172 A | 8/1976 | Kerawalla | |
| 4,343,343 A | 8/1982 | Reuter | |
| 4,534,262 A * | 8/1985 | Swenson | 87/6 |
| 4,651,514 A * | 3/1987 | Collett | 57/227 |
| 4,839,113 A | 6/1989 | Villaine et al. | |
| 4,893,665 A | 1/1990 | Reuter et al. | |
| 4,895,692 A | 1/1990 | Laurent et al. | |
| 5,768,875 A * | 6/1998 | Bergen | 57/225 |
| 5,938,971 A | 8/1999 | Huston et al. | |
| 6,000,454 A | 12/1999 | Barody et al. | |
| 6,224,808 B1 | 5/2001 | Essinger et al. | |
| 6,234,227 B1 | 5/2001 | Bosseaux | |
| 6,261,689 B1 | 7/2001 | Meraldi et al. | |
| 6,283,185 B1 | 9/2001 | Rivaton | |

FOREIGN PATENT DOCUMENTS

| | | |
|---|---|---|
| DE | 41 35 599 | 5/1993 |
| EP | 0 242 840 | 10/1987 |
| EP | 0 335 588 | 10/1989 |
| EP | 0 542 567 | 5/1993 |
| EP | 0 661 179 | 7/1995 |
| EP | 0 718 090 | 6/1996 |
| EP | 0 822 047 | 2/1998 |
| WO | WO 85/05115 | 11/1985 |
| WO | WO 96/09356 | 3/1996 |
| WO | WO 97/06294 | 2/1997 |
| WO | WO 97/47463 | 12/1997 |
| WO | WO 98/23457 | 6/1998 |

* cited by examiner

OTHER PUBLICATIONS

Search Report dated Apr. 29, 2003 issued for the underlying International Application No. PCT/EP03/00311.

*Primary Examiner*—Shaun R. Hurley
(74) *Attorney, Agent, or Firm*—Cohen Pontani Lieberman & Pavane LLP

(57) ABSTRACT

Hybrid cables, a process for obtaining such and a composite fabric usable in a tire incorporating the hybrid cables are disclosed. A tire and a mounted assembly which each incorporate such a composite fabric is also disclosed. The hybrid cable has a ratio of final tangent modulus:initial tangent modulus greater than 10. This hybrid cable consists of a textile core of an initial modulus of less than 900 cN/tex and a textile wrap of an initial modulus greater than 1300 cN/tex which is helically wound around the textile core.

15 Claims, 5 Drawing Sheets

HYBRID CABLES, A PROCESS FOR OBTAINING SUCH AND COMPOSITE FABRICS INCORPORATING SUCH

CROSS-REFERENCE TO RELATED APPLICATIONS

The present application is a continuation of International Application No. PCT/EP 03/00311, filed 15 Jan. 2003, published in French with an English Abstract on 24 Jul. 2003 under PCT Article 21(2) as WO 03/060212, which claims priority to French Patent Application No. 02/00571, filed 17 Jan. 2002.

BACKGROUND OF THE INVENTION

1. Field of the Invention

The present invention relates to hybrid cables, a process for obtaining such and a composite fabric usable in a tire incorporating said cables. The invention also relates to a tire and a mounted assembly which each incorporate such a composite fabric.

2. Description of the Related Art

The development of tires intended to be fitted on passenger vehicles of the type which travel at high speeds has given rise to increasingly high-performance architectures being developed for these tires.

One solution conventionally used for these "high-speed" tire architectures consists of covering the working crown plies of these tires, which comprise metallic or textile reinforcement elements, with what is called a hooping crown ply, usually reinforced by textile cables. This hooping crown ply, which is for example arranged radially to the outside of the crown reinforcement of the tire, is in particular characterized in that the cables which reinforce it are arranged in a spiral at an angle of 0° or close to 0° with the median circumferential plane of the tire. It is also known to arrange relatively narrow strips or plies at an angle of approximately 0° instead of the aforementioned cables, in order to fulfil a hooping function of the crown reinforcement.

Hybrid cables of plied-yarn type, which are formed of two threads based on materials of low and high initial moduli respectively which are twisted together, in order to impart to the cable thus obtained a tensile modulus which is reduced at low deformation and on the contrary high at high deformation have in the past been tested as textile cables for hooping crown plies. This decoupling of the tensile moduli of the cable results in the presence of a transition point on the force/elongation curve of said cable, and it is for example obtained using a polyamide 6,6 for the material of low modulus and aramid for the material of high initial modulus.

For the description of such hybrid cables, reference may be made to US patent specification U.S. Pat. No. 3,977,172 and to the proceedings of the conference Kautschuk+Gummi Kunststoffe, vol. 40, No. 2, February 1987, pages 130–135, in Heidelberg (Germany), E. R. Barron, entitled "Hybrid tire cords containing kevlar® aramid".

One major drawback of these hybrid cables having a plied-yarn structure is the excessive hooping tension of the ply comprising these cables, including at reduced speeds typically less than 120 km/h, (i.e., at relatively low deformations). This tension or premature "stiffening" of the cables results in a running noise due to the tire which is significant at these speeds, which represents a significant source of discomfort for the occupants of the vehicle.

SUMMARY OF THE INVENTION

The object of the present invention is to overcome this drawback, and it is achieved in that the Applicants have recently surprisingly obtained hybrid cables each having a ratio of final tangent modulus:initial tangent modulus greater than 10, which makes it possible for example to reinforce a hooping crown ply of a tire such that:

at reduced deformations inherent at a speed of travel of less than 100 or 120 km/h, the hooping crown ply produces reduced running noise, and that at high deformations inherent at a speed of travel typically greater than 120 km/h, this crown ply performs its hooping function satisfactorily.

It will be noted that the value of the ratio of final tangent modulus:initial tangent modulus which characterizes the hybrid cables according to the invention is greater than those of the same ratios which characterize the hybrid cables obtained to date, which are always less than 10.

Advantageously, this ratio is greater than 12 for the hybrid cables according to the invention, and it is for example between 12 and 30.

It will be noted that the present invention is in no way limited to use in a hooping crown ply of these hybrid cables, and that it covers any use in tires which may be of passenger-vehicle type or intended to bear heavy loads, for example heavy-vehicle tires, or tires for agricultural or construction machinery.

It will also be noted that the hybrid cables according to the invention make it possible to improve the endurance at high speed (typically greater than 120 km/h) of the crown reinforcement of tires the hooping crown ply of which is reinforced by these cables.

"Hybrid cable" is understood in the present description to mean a composite cable, i.e., one constituted of at least two materials of different natures and/or properties.

"Initial tangent modulus" of the hybrid cable according to the invention is understood in the present description to mean the slope of the tangent to the force/elongation curve of this cable corresponding to a zero elongation.

"Final tangent modulus" of this hybrid cable is understood to mean the slope of the tangent to the force/elongation curve of said cable for an elongation corresponding to the breaking thereof.

It will be noted that the hybrid cables according to the invention each have a force/elongation curve which is very close to the trace of the aforementioned tangents to this curve corresponding respectively to a zero elongation and to the breaking of the cable, which results in decoupling of the tangent moduli of said cable at low and high deformations (i.e., at travelling speeds which are reduced and high respectively).

According to a preferred embodiment of the invention, said hybrid cables are of the wrapped type, comprising a textile core of an initial modulus of less than 900 cN/tex and a textile wrap of an initial modulus greater than 1300 cN/tex which is wound on said core.

"Initial modulus" of the core or the wrap is understood in the present description to mean the tensile modulus at low deformation of each of these constituents which has first been extracted from the wrapped hybrid cable. This initial modulus is defined as being the slope of the linear part of the force/elongation curve of the core or of the wrap in the raw state, measured just after a standard initial tension of 0.5 cN/tex.

Said initial moduli and said tangent moduli, as well as all the mechanical properties in extension mentioned in the present description (tenacity, elongation at break, in particular) are measured in known manner by means of measurements of force (daN)/ elongation (%) type, carried out by means of an "INSTRON" machine with "4D" grippers and using the following operating parameters:

traction length: 400 mm,
traction rate: 200 mm/min,
standard initial tension: 0.5 cN/tex.

"Wrapped" cable is understood by definition in the present description to mean a "straight" core on which a wrap is wound, for example in a helix. Reference may for example be made to US patent specifications U.S. Pat. Nos. 4,343,343 and 4,893,665 for the description of wrapped cables which meet this definition.

The expression "straight core" (also conventionally designated in English by the term "core" or "core yarn") is understood to mean a single thread or several threads twisted together on which is wound the wrap (also frequently designated in English by the term "sheath" or "sheath yarn"), which is also formed of a single thread or of several threads twisted together. The assembly of the wrap on the core is therefore carried out without a plying operation on these two constituents, unlike the aforementioned cables of plied structure.

In the present description, the term "thread" designates equally well a spun yarn based on a multitude of elementary filaments of low diameter which are twisted together (for example a spun yarn based on around one hundred elementary filaments each having a diameter close to about ten microns), and a single monofilament.

"Monofilament" is understood to mean a unit filament (non-twisted by definition), the diameter or thickness D of which (that is to say, the smallest transverse dimension of its cross-section when this is not circular) is at least equal to 40 µm (minimum linear density of 1.7 tex). This definition therefore covers equally well monofilaments of essentially cylindrical shape (i.e., with a circular section) and oblong monofilaments, of flattened shape, or even strips or films of thickness D.

According to one example of embodiment of said preferred mode according to the invention, the wrapped hybrid cable is such that said core is formed of a single spun yarn and that said wrap is formed of one or more spun yarns twisted together, preferably from two to four spun yarns twisted together. In this case, a twist of the order of several tens or even several hundreds of turns/meter was imposed on the spun yarn forming the core before winding the wrap on said core.

According to another example of embodiment of said preferred mode according to the invention, the wrapped hybrid cable is such that said core is formed of several spun yarns twisted together and that said wrap is formed of one or more spun yarns twisted together.

According to another example of embodiment of said preferred mode according to the invention, the wrapped hybrid cable is such that said core is formed of a monofilament and that said wrap is formed of a single spun yarn or of several spun yarns twisted together.

According to another example of embodiment of said preferred mode according to the invention, the wrapped hybrid cable is such that said core is formed of a single spun yarn or of several spun yarns twisted together and that said wrap is formed of a monofilament.

According to another example of embodiment of said preferred mode according to the invention, the wrapped hybrid cable is such that said core and said wrap are each formed of a monofilament.

In the present description, the linear density of the spun yarns was determined on at least three samples, each corresponding to a length of 50 m, by weighing this length of spun yarn. The linear density is given in tex (weight in grams of 1000 m of spun yarn—reminder: 0.111 tex equals 1 denier).

The tenacity (breaking load divided by linear density) and the various tensile moduli are indicated in cN/tex (1 cN/tex=0.11 g/den). The elongation at break is indicated in %.

In non-limiting manner, the core of the wrapped hybrid cable of the invention may be formed:

of an aliphatic polyamide, such as a polyamide 6,6,
of an aliphatic polyester, such as polyethylene terephthalate (PET), polyethylene naphthalate (PEN), or
of rayon.

The wrap of the wrapped hybrid cable according to the invention may be for example formed:

of an aromatic polyamide, such as aramid, or
of an aromatic polyester, such as the polyester sold under the name "VECTRA", or alternatively
of a cellulose or a cellulose derivative of liquid-crystal origin of high initial modulus (in particular greater than 1500 cN/tex), such as described for example in patent specifications WO-A-85/05115, WO-A-96/09356 and WO-A-97/06294.

According to one example of embodiment of said preferred mode according to the invention, the wrapped hybrid cable comprises a core of aliphatic polyamide, such as a polyamide 6,6, and a wrap of aromatic polyamide, such as aramid, or of cellulose of high modulus of liquid-crystal origin.

According to another characteristic of said preferred mode according to the invention, the wrapped hybrid cable is such that said core has an elongation at break greater than 10%.

According to another characteristic of said preferred mode according to the invention, the wrapped hybrid cable has a force (daN)/ elongation (%) curve having a transition point, on this side of which the tensile modulus of the cable is substantially equal to that of the core and beyond which the tensile modulus of this cable is substantially equal to that of the wrap, this transition point corresponding to an elongation of between 1 and 7%, preferably of between 2 and 4%.

In known manner, "transition point" (or point of change in slope) refers to the point corresponding to the elongation for which the two tangents at zero elongation and at break intersect.

The wrapped hybrid cable in accordance with said preferred mode of embodiment of the invention is obtained by a process consisting essentially of:

obtaining separately a core and a wrap each formed of a single thread or of a plurality of threads twisted together, then winding, for example in a helix, the wrap on the core, such that the twisting pitch of the core in the wrapped cable is greater than that of the wrap.

This assembly is effected for example by means of a volumetric cabling device and a ring-type frame.

A composite fabric according to the invention comprises a rubber composition based on at least one diene elastomer which is reinforced by said hybrid cables according to the invention (i.e., each having a ratio of final tangent modulus: initial tangent modulus greater than 10), and this composite fabric is usable advantageously in a tire.

"Diene" elastomer is understood to mean, in known manner, an elastomer resulting at least in part (i.e., a homopolymer or a copolymer) from diene monomers, that is to say from monomers bearing two double carbon-carbon bonds, whether conjugated or not.

Preferably, this rubber composition is based on at least one diene elastomer the molar ratio of units originating from conjugated dienes of which is greater than 15% (such a diene elastomer is commonly referred to as "essentially unsaturated").

Thus, for example, diene elastomers such as butyl rubbers or copolymers of dienes and of alpha-olefins of the EPDM type do not fall within the preceding definition, and may be described as "essentially saturated" diene elastomers (molar ratio of units originating from dienes which is always less than 15%).

Even more preferably, this rubber composition is based on at least one diene elastomer the molar ratio of units originating from conjugated dienes of which is greater than 50% (such a diene elastomer is commonly referred to as "highly unsaturated"). This diene elastomer is then preferably selected from among the group consisting of polybutadienes, natural rubber, synthetic polyisoprenes, the various butadiene copolymers, the various isoprene copolymers and mixtures of these elastomers.

Of the polybutadienes, in particular those having a content of -1,2 units of between 4% and 80% or those having a content of cis-1,4 greater than 80% are suitable.

Of the synthetic polyisoprenes, in particular cis-1,4-polyisoprenes, preferably those having an amount of cis-1,4 bonds greater than 90%, are suitable.

Among the butadiene or isoprene copolymers, these are understood to be in particular the copolymers obtained by copolymerization of at least one of these two monomers with one or more vinyl-aromatic compounds having from 8 to 20 carbon atoms. Suitable vinyl-aromatic compounds are, for example, styrene, ortho-, meta- and para-methylstyrene, the commercial mixture "vinyltoluene", para-tert, butylstyrene, methoxystyrenes, chlorostyrenes, vinylmesitylene, divinylbenzene and vinylnaphthalene. The copolymers may contain between 99% and 20% by weight of diene units and between 1% and 80% by weight of vinyl-aromatic units.

Of the butadiene or isoprene copolymers above, mention will preferably be made of butadiene/styrene copolymers, isoprene/butadiene copolymers, isoprene/styrene copolymers or isoprene/butadiene/styrene copolymers.

In summary, preferably a diene elastomer selected from the group of "highly unsaturated" diene elastomers consisting of polybutadienes (BR), natural rubber (NR), synthetic polyisoprenes (IR), butadiene/styrene copolymers (SBR), isoprene/butadiene copolymers (BIR), isoprene/styrene copolymers (SIR), butadiene/styrene/isoprene copolymers (SBIR) and mixtures of these elastomers is suitable.

Advantageously, the rubber composition of the composite fabric according to the invention comprises in a majority proportion (i.e., in a mass fraction greater than 50%) or in its entirety one or more "highly unsaturated" diene elastomers as defined above, possibly in association with one or more "essentially saturated" diene or non-diene elastomers used in a minority proportion, and/or in association with polymers other than elastomers (for example thermoplastic polymers) also used in a minority proportion.

The rubber compositions of the composite fabrics according to the invention also comprise all or some of the additives usually used in the manufacture of tires, such as reinforcing fillers such as carbon black or silica, anti-ageing agents, for example antioxidants, extender oils, plasticizers or agents which facilitate processing of the compositions in the uncured state, a cross-linking system based on either sulfur, or on sulfur and/or peroxide donors, accelerators, vulcanization activators or retarders, methylene acceptors and donors, resins, known adhesion-promoting systems of the type "RFS" (resorcinol/formaldehyde/silica) or metal salts, in particular cobalt salts.

The composite fabric according to the invention may be present in varied forms, for example in the form of a ply, a band, strip or a block of rubber in which there is incorporated the metallic reinforcing thread using different means known to the person skilled in the art, such as for example molding, calendering or extrusion means.

A tire according to a first embodiment of the present invention comprises a crown which is extended by two sidewalls and two beads and which comprises a carcass ply anchored in said beads, said crown comprising:

at least one reinforcing crown ply comprising parallel cables which are oriented relative to the circumferential direction by an angle α of between 10 and 45 degrees, and at least one hooping crown ply comprising cables oriented in said circumferential direction which are wound in a spiral, and this tire is such that said hooping crown ply is constituted of the composite fabric according to the invention as defined previously.

According to one example of embodiment of this first mode according to the invention, this tire is such that said hooping crown ply is arranged radially to the outside of said reinforcing crown ply (plies).

According to another example of embodiment of this first mode according to the invention, this tire is such that said hooping crown ply is arranged radially to the inside of said carcass ply.

According to another example of embodiment of this first mode according to the invention, this tire is such that said crown comprises at least two superposed reinforcing crown plies each comprising parallel cables which are crossed from one ply to the other, forming with said circumferential direction angles (α, β) of between 10 and 45 degrees, and that said hooping crown ply is arranged between said reinforcing crown plies.

According to another example of embodiment of this first mode according to the invention, this tire is such that said crown comprises at least two superposed reinforcing crown plies each comprising parallel cables which are crossed from one ply to the other, forming with said circumferential direction angles (α, β) of between 10 and 45 degrees, and such that said hooping crown ply is arranged between said carcass ply and the reinforcing crown ply which is located radially farthest to the inside.

With reference to any one of these examples of embodiment of said first mode according to the invention, said tire is advantageously such that, over its entire width, the hybrid cables of said hooping crown ply have a high-temperature contraction potential (CS), in the vulcanized, new state of said tire, which is less than or equal to the high-temperature contraction potential of these same cables which have been adherised before their incorporation into said hooping crown ply.

The Applicants have noted that this high-temperature contraction potential characteristic of the hybrid cables of the hooping crown ply makes it possible to reduce even more markedly the running noise of the tire at reduced speed, while imparting thereto a high level of resistance at high speed.

The hybrid cables laid circumferentially with laying diameters which deviate, over the entire width of the crown, by less than 0.5% from the final diameters of these cables in the tire after vulcanization, do not undergo any significant shaping operation during the building of the tire or its vulcanization. Such significant shaping would involve, for example, during the building or the vulcanization, a local extension of these cables greater than 2 or 3%. This extension generally adversely affects the properties of the cables thus deformed, in particular their modulus, their contraction potential and their state of tension.

As a result, the hybrid cables used, in the vulcanized tire and over all of the ply, are in a state very close to that of the adherised cables before they are placed in the tire.

"Adherised cables" is understood to mean cables which have undergone an appropriate coating treatment, referred to as sizing or adherising treatment, capable of making them adhere, after suitable heat treatment, to the aforementioned rubber composition. The cables are sized in a succession of steps by passing into glue baths typical of the prior art, and heat-treated under a tension making it possible to impart thereto the level of contraction potential (CS) required.

"High-temperature contraction potential" (CS) is understood to mean the relative variation in length of a textile reinforcing thread positioned, under a prestress equal to the half-sum of the linear densities of each of the elementary yarns, between the shelves of an oven (TESTRITE™-type) regulated at a constant temperature of 185 ±0.5° C. This potential is expressed in % by the following formula: CS $(\%)=100\times|L_1-L_0|/L_0$, where $L_0$ is the initial length of the adherised reinforcing thread, at ambient temperature under a prestress equal to the half-sum of the linear densities of each of the elementary yarns and $L_1$ the length of this same reinforcing thread at 185° C. The length $L_1$ is measured at the end of a reinforcing thread stabilisation time at a temperature of 185° C. equal to 120 s±2%. The standard deviation on the CS measurement is ±0.15%.

This potential is the direct consequence of the series of operations which the reinforcing thread underwent on its manufacture or on its use.

The high-temperature contraction potential of the hybrid cables according to the invention before their incorporation in the tire is preferably greater than 0.5% and, even more preferably, greater than 1%.

After vulcanization of a tire according to the invention, several sections of hybrid cables were extracted from the hooping crown ply and their high-temperature contraction potential was measured immediately (that is, the time interval separating extraction of the cables from introduction of these same cables into the TESTRITE™ oven is less than 60 seconds). These measurements confirmed that the value of their CS is far less than or equal to what they had before introduction into the tire, whatever their axial position in the tire.

According to one embodiment according to the invention, the tire according to the invention can advantageously be built on a rigid core imposing the shape of its inner cavity, such as those described in patent specifications EP-A-242 840 or EP-A-822 047. There are applied to this core, in the order required by the final architecture, all the constituents of the tire, which are arranged directly in their final position, without undergoing shaping at any moment of the building operation. The curing takes place on the core, the latter only being removed after the vulcanization phase has finished.

This method of manufacture has the advantage of greatly reducing, or even eliminating, the pre-stresses imposed on the cables, particularly the hybrid cables oriented at 0°, during the traditional shaping phases.

The non-pneumatic tire may also be partially cooled on the core in order to keep the reinforcing threads in the state of deformation imposed upon laying.

According to another embodiment of the invention, it is also possible to manufacture the tire equivalently on a drum such as described in patent specifications WO-A-97/47463 or EP-A-718 090, on condition that the tire blank be shaped before laying the circumferentially oriented hybrid cables.

According to another embodiment according to the invention, the hybrid cables can also be laid on a form with geometry identical to the form aimed at in the curing mould. The crown block is then assembled with the complementary blank of the tire using transfer techniques known to the person skilled in the art, then, still using known principles, the tire is fitted and pressurized by deploying a membrane inside the tire.

This embodiment also guarantees the absence of pre-stresses due to the shaping in the vulcanization press.

All these embodiments make it possible to obtain circumferentially oriented hybrid cables that are spiral-wound with laying diameters diverging, over the whole width of the crown, by less than 0.5% from the final diameters of these cables in the tire after vulcanization.

A mounted assembly according to one example of embodiment of the invention, usable for fitting on a heavy vehicle, comprises a rim, a tire mounted on said rim and a support membrane which is mounted on said rim within said tire and which is adapted to support said tire in the event of a drop in the pressure within said tire, such that said mounted assembly comprises in its inner space two mutually airtight cavities which are separated from each other by said membrane, which is reinforced in its crown by at least one reinforcing crown ply and by a hooping crown ply, which comprises cables oriented in the circumferential direction of said mounted assembly.

This mounted assembly is such that said hooping crown ply is constituted of the composite fabric according to the invention as defined previously.

The cavity inside this membrane is intended to be inflated to a pressure greater than that of the remaining cavity of the tire. Under these conventional conditions of use, the membrane has a rolling radius at the crown which is less than the loaded radius of the tire used at its recommended pressure.

In the event of a puncture in the tire, as soon as the pressure difference between the cavity inside the membrane and that of the tire exceeds a given value, the hooping crown ply of the membrane breaks, causing the membrane to be deployed beneath the tire and thus enabling the mounted assembly to continue to travel under acceptable conditions in degraded mode. Reference may be made to patent specification WO-A-98/23457 for a description of the general operation of this mounted assembly.

BRIEF DESCRIPTION OF THE DRAWINGS

The aforementioned characteristics of the present invention, as well as others, will be better understood on reading the following description of several examples of embodiment of the invention, which are given by way of illustration and not of limitation, said description being made with reference to the attached drawings, in which.

DETAILED DESCRIPTION OF THE PRESENTLY PREFERRED EMBODIMENTS

Example of embodiment of a wrapped hybrid cable according to the invention

A wrapped hybrid cable according to the invention was produced by producing separately, in the opposite direction and at the same twisting pitch:

on one hand, a thread which is twisted on itself (commonly referred to as "folded yarn" by the person skilled in the art) based on a spun yarn of polyamide 6,6 of a linear density equal to 94 tex which is intended to constitute the core of the cable and, on the other hand, a thread based on two spun yarns plied together (commonly referred to as "plied yarn" by the person skilled in the art) made of Kevlar® (aramid), each having a linear density equal to 167 tex, this thread being intended to constitute the wrap of said cable.

More precisely, the core plied yarn is twisted in the S direction at a pitch of 200 turns/meter (S200), and the wrap spun yarns are twisted together in the Z direction at the same pitch (Z200).

Then the wrap thread is wound in a helix on the core thread, imparting an additional twist of 115 turns/meter, by means of a volumetric cabling device and a ring-type frame, this additional twist being effected in the twisting direction (S) of the core, such that the twisting pitch of the core in the wrapped cable is 315 turns/meter in the S direction, and that that of the wrap in said cable is 85 turns/meter in the Z direction.

The wrapped hybrid cable thus obtained is then sized, using a treatment tension of 0.25 daN.

Figure 1:
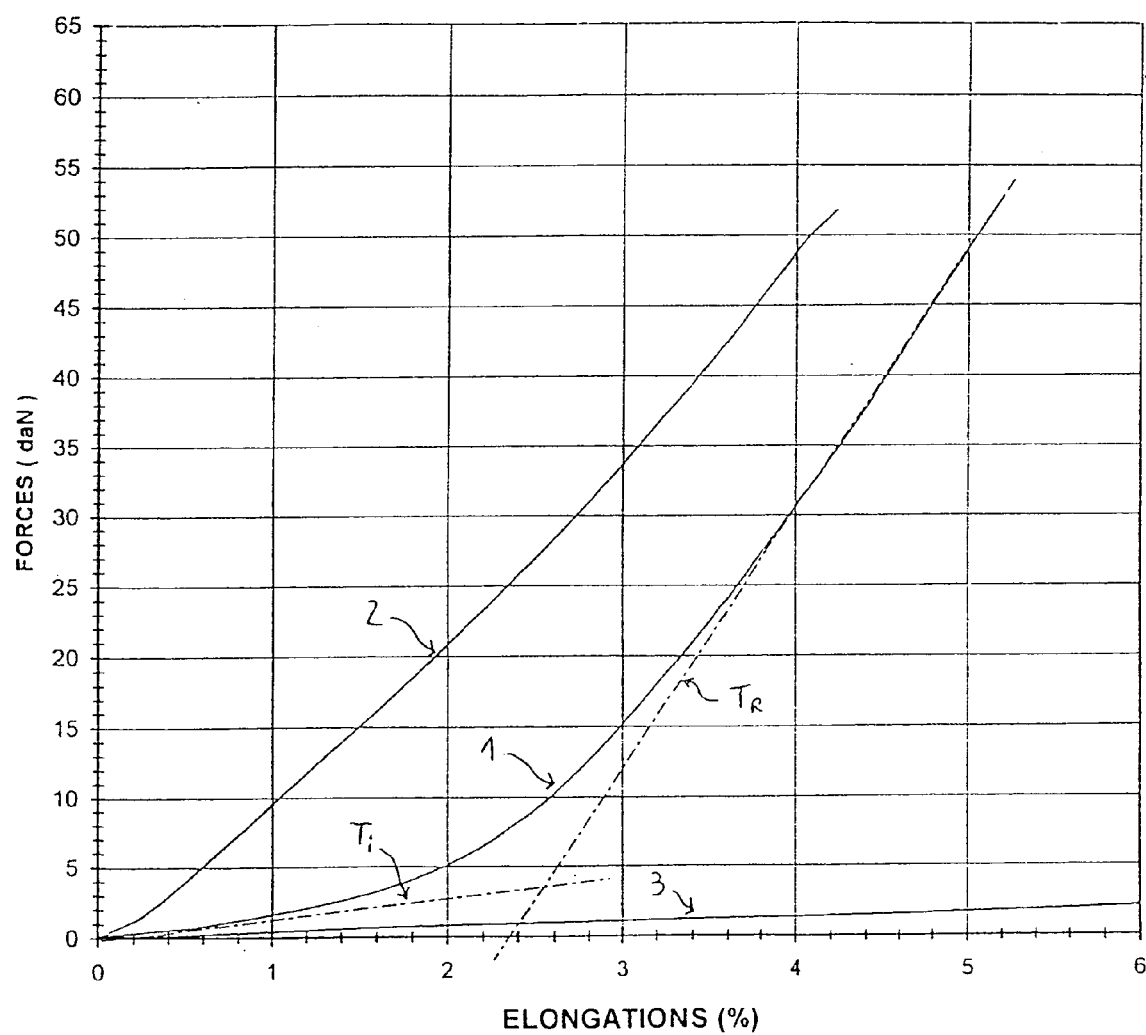
FIG. 1 is a graph illustrating the force/elongation characteristic of a hooped hybrid cable according to the invention.

FIG. 1 shows the force/elongation curve obtained for this sized wrapped hybrid cable according to the invention (reference 1 in this FIG. 1), in comparison:

with the curve 2 of a thread of plied-yarn type, which is formed of two Kevlar® spun yarns twisted together (each having a linear density of 167 tex and being twisted at a pitch of 315 turns/meter), and with the curve 3 of a spun yarn of polyamide 6,6 (having a linear density of 94 tex and being twisted on itself at a pitch of 300 turns/meter).

There are also shown in this FIG. 1 the tangents to the curve 1 of the wrapped hybrid cable according to the invention, on one hand, for a zero elongation (tangent $T_i$) and, on the other hand, for an elongation corresponding to the breaking of the cable (tangent $T_R$). These tangents intersect at a transition point corresponding to an elongation of the cable of approximately 2.5%.

Calculating the slopes of these tangents $T_i$ and $T_R$ gives the initial and final tangent moduli of the cable for a zero elongation and an elongation at break, respectively. The ratio of final tangent modulus:initial tangent modulus of said cable is deduced therefrom.

There is obtained for the tangent $T_R$ a slope of approximately 1.01 daN and, for the tangent $T_i$, a slope of approximately 0.078 daN, hence a value of 12.95 for the value of the ratio of final tangent modulus:initial tangent modulus of the wrapped hybrid cable according to the invention.

This very significant decoupling of the tangent moduli at low and high deformations results in the fact that the force/elongation curve of the wrapped hybrid cable according to the invention is very close to the trace of the tangents $T_i$ and $T_R$.

It will be noted that at reduced deformations inherent at a speed of travel of less than 120 km/h for example, the tensile modulus of the wrapped hybrid cable corresponds substantially to that of the core which it comprises (see the analogous slopes of the characteristics 1 and 3 at low elongation in FIG. 1), which results in reduced running noise, when this cable is used as reinforcement element for a hooping crown ply of a tire.

It will also be noted that at high deformations inherent at a speed of travel of greater than 120 km/h for example, the tensile modulus of the wrapped hybrid cable corresponds substantially to that of the wrap which it comprises (see the analogous slopes of the characteristics 1 and 2 at high elongation in FIG. 1), which results in a satisfactory hooping function of the crown ply reinforced by these cables.

Figure 10:
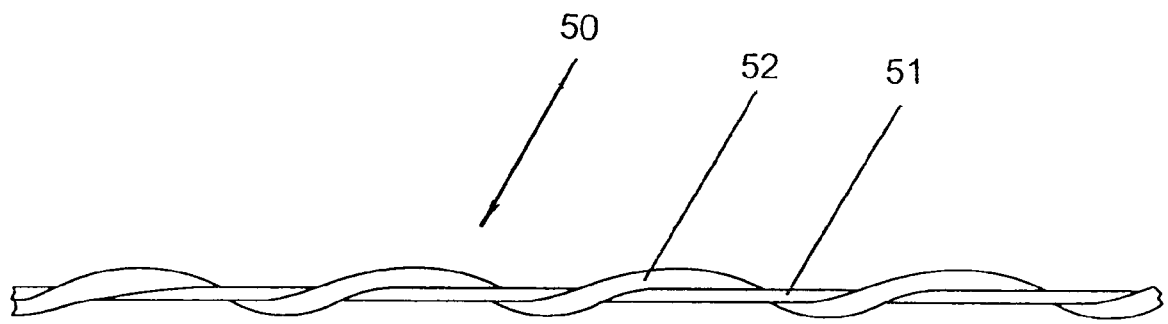
FIG. 10 shows a hybrid cable according to the invention.

FIG. 10 shows such a hybrid cable 50 consisting of a straight textile core 51 and a single textile wrap 52 which is helically wound around the core 51.

The two series of tests below illustrate the advantages provided by the wrapped hybrid cables according to the invention in tire hooping crown plies.

First series of running tests on a vehicle fitted with passenger-vehicle tires the crown of which comprises two crossed reinforcing crown plies and a hooping crown ply superposed layers by a technique of winding a band of cables coated in rubber in a spiral. The density of these cables is 200 cables per dm.

In the case of the tires B, the cables of this hooping crown ply are made of aramid. This ply is arranged in a single layer with a cable density of 50 cables per dm.

In the case of the tires C, the cables of this hooping crown ply are made of the wrapped hybrid cables according to the invention manufactured in accordance with the above example of embodiment (based on an aramid wrap wound in a helix on a polyamide 6,6 core). This ply is also arranged in a single layer with a cable density of 50 cables per dm.

Four tests were carried out for each of these tires A, B and C:

"body hum": this test is representative for a passenger of the acoustic discomfort caused on passage of the vehicle at a constant speed over a highway-type road of average grading. A vehicle is run at a given speed over a standardized measurement area, and microphones register the noise level in dB(A);

"coast by" noise: this test is representative for a nearby resident of the acoustic discomfort produced on passage of the vehicle at constant speed over a motorway-type road of intermediate grading; The vehicle is made to pass at a given speed, transmission in neutral and engine switched off, over a standardised measurement area (standard ISO DIS 10 844), and microphones register the noise levels in dB(A);

"contact": this test is representative for a passenger of the vibration and acoustic discomfort caused on passage of the vehicle at a constant speed over an obstacle of manhole-cover type. The vehicle is made to pass over this cover at a given speed, and the operator assesses the vibratory and acoustic level then translates the gain (−) or the degeneration (+) on a scale from −2 to +2, the "control" tire (reference) being at 0;

speed resistance: at a given load and inflation pressure, the speed of the tire is progressively increased until it is destroyed, and the result of the test is given by the maximum speed attained and by observation of the cause of destruction of the tire.

Tables 1 and 2 below show the results obtained.

TABLE 1

| Tires | Hooping crown ply | Ply density° (cables/dm) | Body hum | Coast by noise | Contact | Speed resistance |
|---|---|---|---|---|---|---|
| A | Polyamide 6,6 | Bi-layer - 200 | reference | reference | reference | 100 |
| C | wrapped hybrids | Monolayer - 50 | −0.4 dB(A) | equal to reference | −0.5 pts | 110 |

These tests relate to tires A, B and C of dimensions 235/55-17 which are intended to be fitted on high-speed vehicles of passenger-vehicle type. The crown block of each of these tires comprises two crossed reinforcement plies each comprising non-hooped metal 6.23 cables with a pitch of 1.5 mm, and also a hooping crown ply comprising cables oriented in the circumferential direction of the tire.

In the case of the tires A, the cables of this hooping crown ply are made of polyamide 6,6 (conventional hooping solution for a "high performance" tire). In order to obtain an acceptable speed resistance, this ply is arranged in two This Table 1 shows that the wrapped hybrid cables used in the hooping crown ply impart to the tires C according to the invention, compared with the "control" tires A incorporating cables of polyamide 6,6 in the hooping crown ply, an improvement in the speed resistance and also a reduction in the "body hum" and "contact" noise, despite the cable density which is lower than that used in these "control" tires A.

It will be noted that these wrapped hybrid cables do not adversely affect the "coast by" noise of the tires C according to the invention, compared with that of the "control" tires A.

TABLE 2

| Tires | Hooping crown ply | Ply density° (cables/dm) | Coast by noise | Speed resistance |
|---|---|---|---|---|
| B | aramid | Monolayer - 50 | reference | 100 |
| C | wrapped hybrids | Monolayer - 50 | −2 dB (A) | 100 |

This table 2 shows that, considering the tire B as "control", the wrapped hybrid cables impart to the tire C according to the invention a great reduction in "coast by" noise, without the speed resistance being adversely affected.

Second Series of Running Tests on a Vehicle Fitted with Passenger-vehicle Tires the Crown of which Comprises Two Crossed Reinforcing Crown Plies, Two Other Reinforcing Crown Plies and a Hooping Crown Ply These tests also relate to tires D and E of dimensions 235/55-17 which are intended to be fitted on high-speed vehicles of passenger-vehicle type. The crown block of each of these tires comprises two crossed reinforcement plies each comprising non-hooped 2.23 metal cables with a pitch of 0.7 mm, two other reinforcing crown plies each comprising non-hooped 4.23 metal cables with a pitch of 1.25 mm, and also a hooping crown ply comprising cables oriented in the circumferential direction of the tire.

In the case of the tires D, the cables of this hooping crown ply are made of polyamide 6,6. This ply is arranged in two superposed layers by a technique of winding a band of cables coated in rubber in a spiral. The density of these cables is 200 cables per dm.

In the case of the tires E, the cables of this hooping crown ply are made of the wrapped hybrid cables according to the above example of embodiment of the invention (based on an aramid wrap wound in a helix on a polyamide 6,6 core). This ply is arranged in a single layer with a cable density of 50 cables per dm.

An additional test was carried out for these tires D and E: determination of the drift rigidity: at given speed, inflation pressure and load, a drift angle is set and the resultant drift thrust is measured, the result being expressed by taking the drift thrust : drift angle ratio. The measurement is conventionally made between ±1 degree drift angle.

Table 3 hereafter shows the results obtained for the drift rigidity, "body hum" (abbreviated to "BH" below) and "contact" tests.

This Table 3 shows that the wrapped hybrid cables used in the hooping crown ply impart to the tires E according to the invention a greatly improved drift rigidity and also reduced "body hum" and "contact" noise, compared with the "control" tires D.

Figure 2:
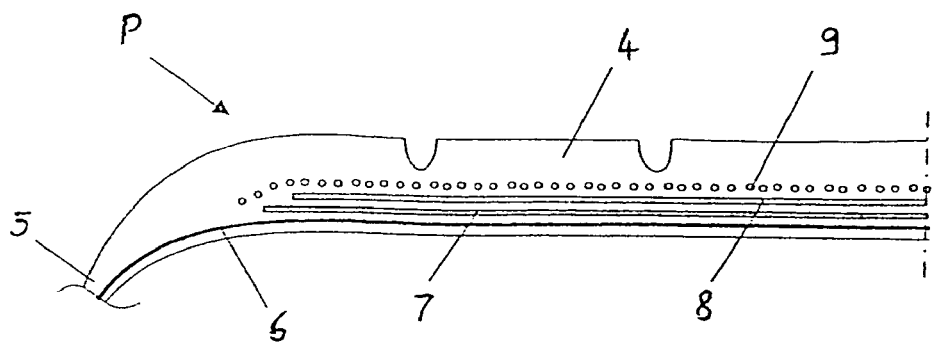
FIG. 2 is a view in axial half-section of a tire comprising a hooping crown ply arranged according to one embodiment of the invention.

Examples of Arrangement In the Tire of Hooping Crown Plies Comprising the Wrapped Hybrid Cables According to the Invention FIG. 2 shows an axial half-section through a tire P according to the invention, which comprises a crown 4 extended by two sidewalls 5 and two beads (not shown).

The crown 4 comprises a carcass ply 6 anchored in known manner in the two beads, two reinforcement plies 7 and 8 formed of cables which are parallel within each ply and are crossed from one ply to the next, forming with the circumferential direction angles (α, β) of the order of 30 degrees, and a hooping crown ply 9 comprising the wrapped hybrid cables according to the invention.

These wrapped hybrid cables are wound in a spiral to ensure good hooping of the crown 4, and they are oriented in the circumferential direction of the tire P.

The carcass ply 6 is of radial type, being oriented substantially at 90 degrees relative to this circumferential direction.

Figure 3:
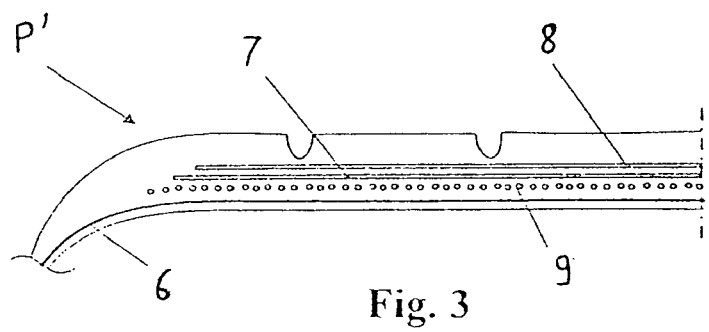
FIG. 3 is a view in axial half-section of a tire comprising a hooping crown ply arranged according to another example of embodiment of the invention.

FIG. 3 shows a partial axial half-section through a tire P' comprising as previously a carcass ply 6, two crossed reinforcement plies 7, 8 and a hooping crown ply 9 which is arranged radially between the carcass ply 6 and the two crossed reinforcement plies 7 and 8. This arrangement has the advantage of protecting the hooping crown ply 9 from possible damage due to perforation of the tread.

Figure 4:
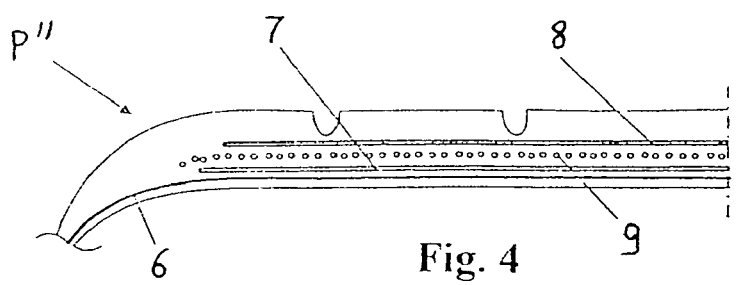
FIG. 4 is a view in axial half-section of a tire comprising a hooping crown ply arranged according to another example of embodiment of the invention.

FIG. 4 shows a partial axial half-section through a tire P'" comprising as previously a carcass ply 6, two crossed reinforcement plies 7, 8 and a hooping crown ply 9 which is arranged between the two crossed reinforcement plies 7 and 8.

Figure 5:
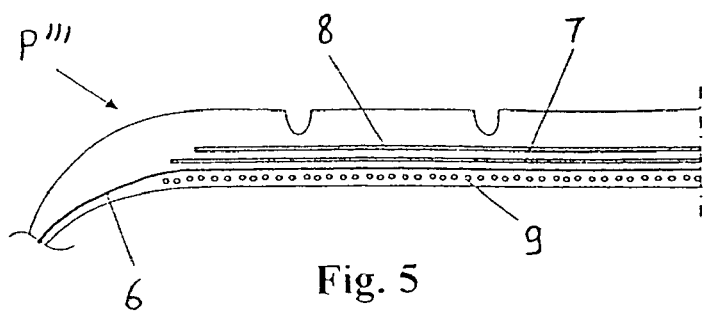
FIG. 5 is a view in axial half-section of a tire comprising a hooping crown ply arranged according to another example of embodiment of the invention.

FIG. 5 shows a partial axial half-section through a tire P"" comprising as previously a carcass ply 6, two crossed reinforcement plies 7, 8 and a hooping crown ply 9 which is arranged radially within the carcass ply 6.

It will be noted that the wrapped hybrid cables according to the invention impart to the tires P, P', P" or P'" the hooping crown ply 9 of which incorporates these cables the aforementioned advantages of a reduction in running noise at reduced speed and of satisfactory hooping at high speed.

TABLE 3

| Tires | Hooping crown ply | Ply density (reinforcing thread/dm) | Drift rigidity at 0.5 Z (ETRTO) | Drift rigidity at 1.0 Z (ETRTO) | Drift rigidity at 1.5 Z (ETRTO) | BH | Contact |
|---|---|---|---|---|---|---|---|
| D | Polyamide 6,6 | Bi-layer - 200 | 100 | 100 | 100 | reference | reference |
| E | Wrapped hybrid | Monolayer - 50 | 110 | 115 | 120 | −0.4 dB(A) | +0.5 pts |

Figure 6:
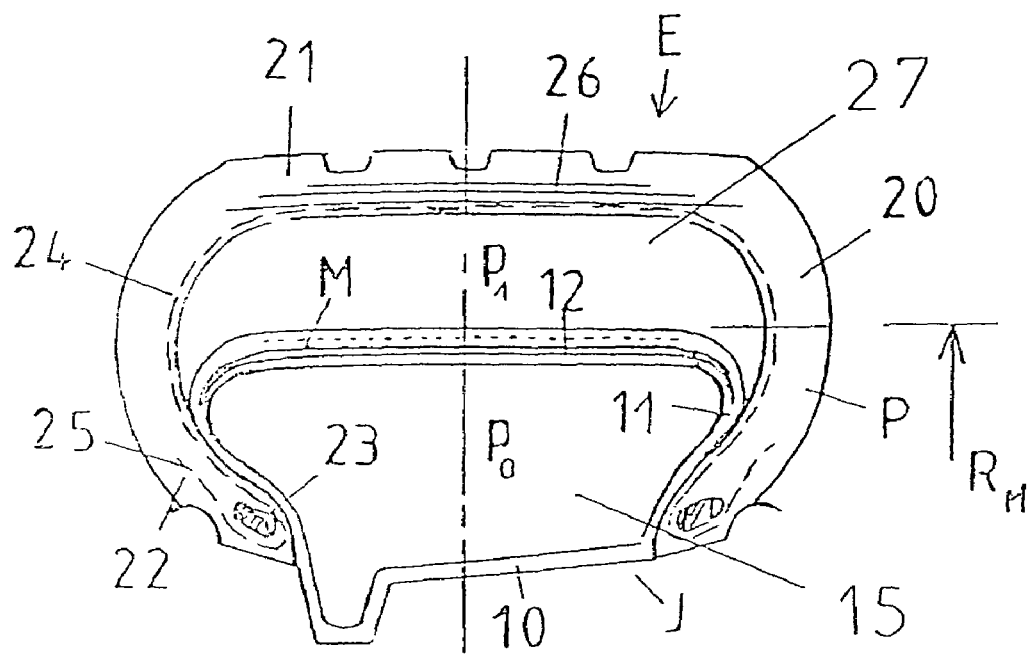
FIGS. 6 and 7 represent respectively, diagrammatically, diametrically opposed meridian sections through a mounted assembly comprising a rim, a tire and a safety membrane, when the tire is under load pressure and travelling under normal conditions.
Figure 7:
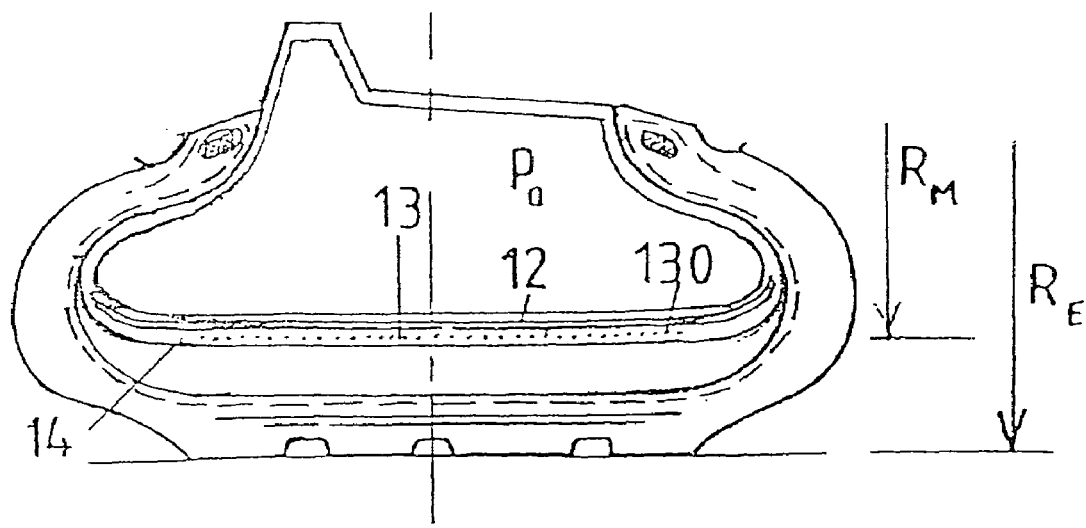

Example of Embodiment of a Mounted Assembly According to the Invention Intended to be Fitted on a Heavy Vehicle FIGS. 6 and 7 show a mounted assembly E according to the invention for heavy vehicle comprising a tire P, a mounting rim J and a support membrane M.

The tire P conventionally comprises sidewalls 20 joined radially to the outside to a tread 21, and extended radially to the inside by two beads 22, each bead being reinforced by at least one bead wire 23 around which is anchored a radial carcass reinforcement 24 to form upturns 25. The carcass reinforcement 24 is radially surmounted in the crown by a crown reinforcement 26, composed of at least two plies of metal wires or cables which are parallel to each other within each ply and crossed from one ply to the next, forming with the circumferential direction of the tire P an angle which may be of between 5° and 45°.

The tire P is said to be tubeless, and comprises an internal layer formed of a rubber composition impermeable to the inflation gases. The assembly of tire P and rim J defines a first airtight inner cavity 27.

The pneumatic support membrane M defines within the first cavity 27 a second airtight cavity 15. This membrane M is closed, comprises sidewalls 11 and is reinforced in its crown by a crown reinforcement 12. The latter, which is readily expansible, is associated with a hooping reinforcement 13 composed for example of a hooping crown ply 130 of circumferentially oriented cables.

According to the invention, these circumferential cables of the hooping crown ply 130 are wrapped hybrid cables according to the invention, for example made of an aramid wrap wound in a helix on a polyamide 6,6 core.

These wrapped hybrid cables enable the ply 130 to provide a satisfactory hooping function of the membrane M, on one hand, against the forces due to the centrifugal force and, on the other hand, against the forces due to the pressure differential $p_0-p_1$, $p_0$ being the inflation pressure in the cavity 15 of the support membrane M, equal for example to $9.5 \times 10^5$ Pa, and $p_1$ being the pressure in the cavity 27 of the tire P, equal for example to $9.0 \times 10^5$ Pa. These inflation values are the rated values in the cold state in the example selected.

This hooping function enables the membrane M to maintain, under normal conditions of travel of the mounted assembly E, that is to say under the conditions of load, pressure and speed recommended for the tire P in question, a radius $R_M$ which is practically constant and less than the loaded radius $R_E$ of the tire P (FIG. 7 representing the loaded part of the mounted assembly E under normal conditions of travel).

The membrane M is completed by the covering of the hooping reinforcement 13, by a layer of rubber 14 of low thickness.

Figure 8:
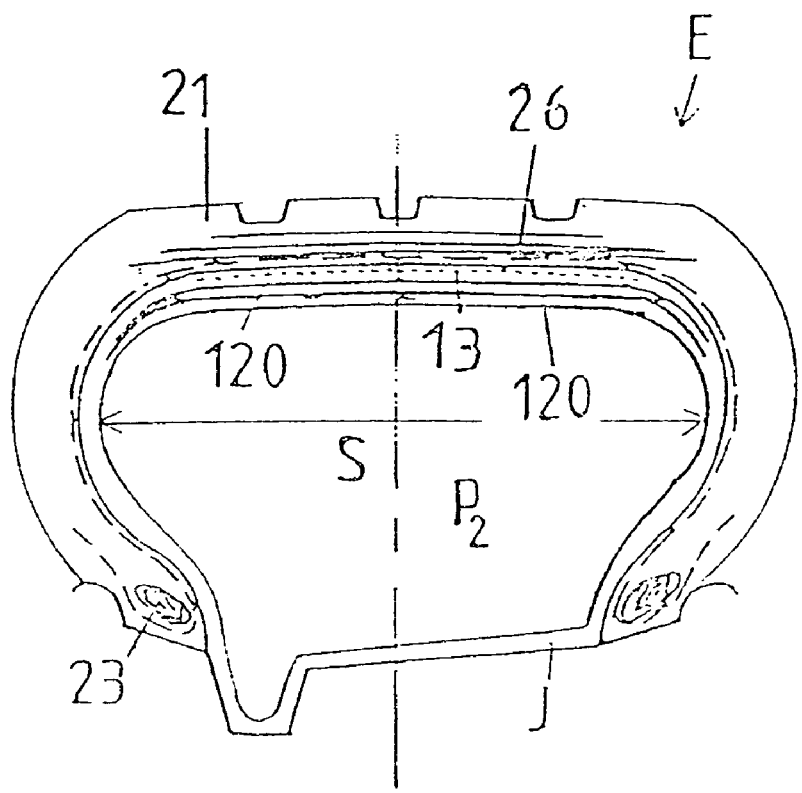
FIGS. 8 and 9 represent respectively, diagrammatically following the pattern of FIGS. 6 and 7, the meridian sections of the same mounted assembly which is subjected to travel in degraded mode.
Figure 9:
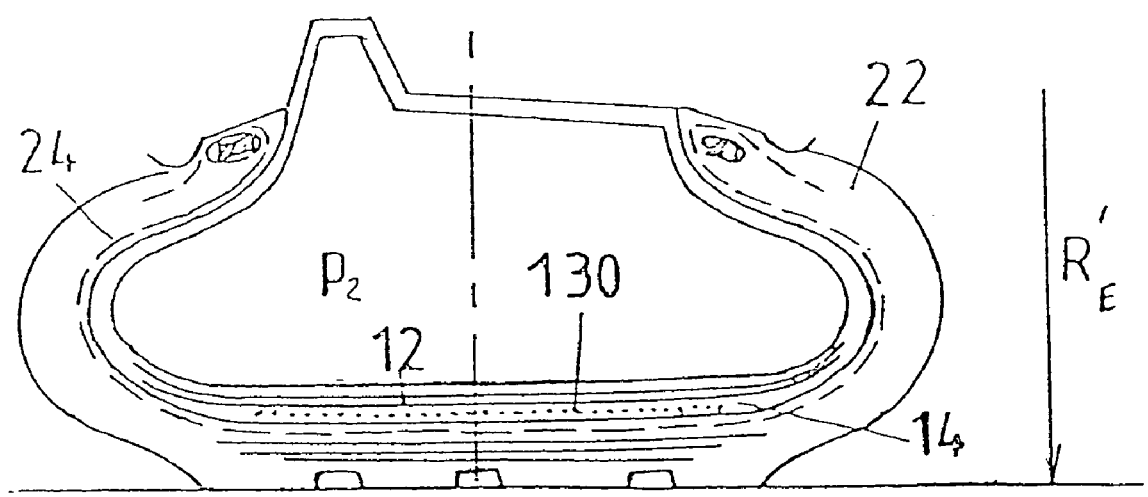

When the tire P loses internal pressure, slowly or suddenly, and whatever the reason for this pressure loss ($p_1$ decreases), the pressure difference $p_0-p_1$ increases until it becomes such that the cables of the ply 130 break and thus permit the expansion of the support membrane M until it completely occupies the cavity 27 of the tire P (see FIG. 8 and 9).

As the increase in volume involves a reduction in the initial internal pressure $p_0$ of the membrane M, the mounted assembly E operates at a lower pressure $P_2$, resulting in a loaded radius $R'_E$ during travel in degraded mode which is less than the loaded radius $R_E$ during normal travel (see FIG. 9). The radius $R'_E$ however permits travel at moderate speed without major degradation of the tire P and without human intervention until the next service area, at which service area it is then possible to provide the additional pressure necessary in order to obtain a radius very close to the radius $R_E$ and permit travel under practically normal conditions.

The invention claimed is:

1. A hybrid cable, consisting of a straight textile core having an initial tensile modulus of less than 900 cN/tex, and a single textile wrap having an initial tensile modulus of greater than 1300 cN/tex which is wound in a helix around said core, wherein the hybrid cable has:
 a force/elongation curve having a transition point corresponding to an elongation of between 1% and 7%;
 a tensile modulus which is substantially equal to the initial modulus of said core below said transition point, and which is substantially equal to the initial modulus of said wrap beyond said transition point; and
 a ratio of final tangent modulus : initial tangent modulus greater than 10.

2. A hybrid cable according to claim 1, wherein said ratio is greater than 12.

3. A hybrid cable according to claim 1, wherein said core has an elongation at break greater than 10%.

4. A hybrid cable according to claim 1, wherein said transition point corresponds to an elongation of between 2% and 4%.

5. A hybrid cable according to claim 1, wherein said core and said wrap are each formed of a single thread or a plurality of threads twisted together, each thread being formed either of a spun yarn based on a multitude of elementary filaments, or of a monofilament.

6. A hybrid cable according to claim 5, wherein said core is formed of a single spun yarn and said wrap is formed of one or more spun yarns twisted together.

7. A hybrid cable according to claim 5, wherein said core is formed of a plurality of spun yarns twisted together and said wrap is formed of one or more spun yarns twisted together.

8. A hybrid cable according to claim 5, wherein said core is formed of a monofilament and said wrap is formed of a single spun yarn or of a plurality of spun yarns twisted together.

9. A hybrid cable according to claim 5, wherein said core is formed of a single spun yarn or a plurality of spun yarns twisted together and said wrap is formed of a monofilament.

10. A hybrid cable according to claim 5, wherein said core and said wrap are each formed of a monofilament.

11. A hybrid cable according to claim 1, wherein said core is formed of a polymer selected from the group consisting of aliphatic polyamide, aliphatic polyester, and rayon.

12. A hybrid cable according to claim 1, wherein said wrap is formed of a polymer selected from the group consisting of aromatic polyamide, aromatic polyester, cellulose of liquid-crystal origin, and cellulose derivative of liquid-crystal origin.

13. A hybrid cable according to claim 1, wherein said core and said wrap are both twisted spun yarns.

14. A hybrid cable according to claim 1, wherein said core and said wrap are spun yarns which are twisted in opposite directions.

15. A hybrid cable according to claim 1, wherein said core is formed of aliphatic polyamide and said wrap is formed of aramid.

\* \* \* \* \*